United States Patent
Dagenais et al.

(10) Patent No.: US 10,422,368 B2
(45) Date of Patent: Sep. 24, 2019

(54) ADAPTER FOR A SHIPPING CONTAINER CONNECTOR

(71) Applicants: Frederick W. Anton Engelbrecht, Cape Coral, FL (US); Richard Alan Stahl, Englewood, FL (US); Marshall Roy Crosby, Jonesboro, GA (US)

(72) Inventors: Roderick R. Dagenais, Sarasota, FL (US); Richard Alan Stahl, Englewood, FL (US); Marshall Roy Crosby, Jonesboro, GA (US)

( * ) Notice: Subject to any disclaimer, the term of this patent is extended or adjusted under 35 U.S.C. 154(b) by 658 days.

(21) Appl. No.: 15/077,217

(22) Filed: Mar. 22, 2016

(65) Prior Publication Data

US 2016/0281758 A1 Sep. 29, 2016

Related U.S. Application Data

(60) Provisional application No. 62/136,728, filed on Mar. 23, 2015.

(51) Int. Cl.
| | |
|---|---|
| *F16B 21/06* | (2006.01) |
| *F16B 33/00* | (2006.01) |
| *F16B 35/06* | (2006.01) |
| *F16B 13/08* | (2006.01) |

(52) U.S. Cl.
CPC .......... *F16B 21/065* (2013.01); *F16B 33/002* (2013.01); *F16B 35/06* (2013.01); *F16B 13/0833* (2013.01)

(58) Field of Classification Search
CPC ... F16B 5/02; B65D 90/0006; B65D 90/0013; Y10T 403/7005; B64D 9/003; B60P 7/06; B60P 7/132
See application file for complete search history.

(56) References Cited

U.S. PATENT DOCUMENTS

| | | | | |
|---|---|---|---|---|
| 2,390,325 A | * | 12/1945 | Rapp | F16B 5/02 411/366.1 |
| 4,068,878 A | * | 1/1978 | Wilner | B66C 1/663 294/82.17 |
| 4,394,101 A | * | 7/1983 | Richer | B60P 7/132 24/DIG. 56 |

(Continued)

FOREIGN PATENT DOCUMENTS

| | | | | |
|---|---|---|---|---|
| CH | 708 136 | * | 12/2014 | ............ B60P 7/13 |
| DE | 29 46 224 | * | 6/1981 | ............ B60P 7/13 |
| EP | 0 228 358 | * | 12/1986 | ............ B60P 7/13 |

*Primary Examiner* — Michael P Ferguson
(74) *Attorney, Agent, or Firm* — John Rizvi; The Patent Professor ®

(57) ABSTRACT

An adapter for use with a connector of a shipping container is disclosed, the adapter including a support body, a bolt and, optionally, a nut that can thread to the shaft of the bolt. The support body includes a front body portion having a through bore for passage of a shaft of the bolt and a U-shaped body portion extending from the front body portion, the U-shaped body portion including pair of elongate posts. The bolt is rotatable from a first position in which a bolt head rests against longitudinal ends of the pair of elongate posts to a second position in which the bolt head is received between the pair of elongate posts and in which the pair of elongate posts prevent the bolt head from rotating. The adapter provides the connector with an outwardly protruding shaft to which devices or apparatus can be coupled.

17 Claims, 10 Drawing Sheets

(56) References Cited

U.S. PATENT DOCUMENTS

| | | | | |
|---|---|---|---|---|
| 4,419,034 | A | * | 12/1983 | DiMartino .............. B60P 7/132 |
| | | | | 24/453 |
| 4,629,379 | A | | 12/1986 | Harris et al. |
| 4,993,125 | A | * | 2/1991 | Capron .............. B65D 90/0006 |
| | | | | 24/287 |
| 5,237,784 | A | | 8/1993 | Ros |
| 6,164,862 | A | | 12/2000 | Takaguchi |
| 6,364,584 | B1 | | 4/2002 | Taylor |
| 6,722,831 | B2 | * | 4/2004 | Rogers .................... F16B 21/02 |
| | | | | 411/345 |
| 6,729,098 | B1 | | 5/2004 | Brennan, Jr. |
| 7,125,212 | B2 | | 10/2006 | Moore et al. |
| 7,717,290 | B2 | | 5/2010 | Gerding |
| 8,166,715 | B2 | | 5/2012 | De Azambuja |
| 8,550,274 | B2 | | 10/2013 | Gerding |
| 8,720,126 | B2 | | 5/2014 | Strickland et al. |
| 8,770,442 | B2 | | 7/2014 | Cantin et al. |

* cited by examiner

ADAPTER FOR A SHIPPING CONTAINER CONNECTOR

CROSS-REFERENCE TO RELATED APPLICATION

This application claims the benefit of U.S. Provisional Patent Application Ser. No. 62/136,728, filed Mar. 23, 2015, which is incorporated by reference herein in its entirety.

FIELD OF THE INVENTION

The present invention relates generally to an adapter for use with a connector of a transport or shipping container such as an International Standards Organization ("ISO") shipping container and, for instance, to an adapter for connecting auxiliary components to corner or ISO connectors of an ISO container.

BACKGROUND OF THE INVENTION

Shipping large quantities of materials interstate and overseas is often accomplished with the use of large standardized shipping containers. When the containers are constructed to a set of international standards issued by the International Standards Organization (ISO) they are referred to as ISO containers. The ISO containers are large, hollow rectangular boxes having standardized corner connectors at all corners for attachment to fasteners, such as for attaching containers to adjacent shipping containers and stabilizing the containers as a single unit during shipping. The standard corner connectors, commonly referred to as ISO connectors, are sufficiently strong at to enable the containers to be lifted from the corners. Occasionally, it is desirable to attach other equipment or cables to the corner connectors.

Additionally, surplus ISO containers are often sold or made available on a secondary market for use by the general public. These containers are used by businesses for extra on site storage, by individuals for storage sheds for recreational toys or home equipment, by recreationists and converted into make shift campers or cabins, etc. Various equipment is often attached to the corner connectors of the ISO containers by use of common connectors, bolts, etc. which often cannot support the weight of the equipment and fail.

Accordingly, there is an established need for a system and method of attaching auxiliary components to the ISO containers. There is further an established need for a system and method of providing an adapter for use in the corner connectors of the ISO containers to attach auxiliary components and transfer forces exerted by these components to the structure of the ISO container.

SUMMARY OF THE INVENTION

The present invention is directed to an adapter for a shipping container to connect auxiliary structures to the shipping container. The adapter is configured to attach to a connector of the container, the adapter generally including a support body, a bolt having a bolt head and a shaft and, optionally, a nut threadingly engageable with the shaft of the bolt. The support body includes a front body portion having a through bore for passage of the shaft of the bolt and a pair of elongate posts extending from the front body portion. The bolt is movable from a first position in which the bolt head rests against a free longitudinal end of the elongate posts facilitating insertion of the adapter into the container connector, to a second position in which the bolt head is rotationally locked between the elongated posts and prevents the adapter from being removed from the container connector while the shaft protrudes outward from the container connector. The adapter can be easily, rapidly and firmly secured to a connector of a shipping container, and particularly to an ISO connector of an ISO container, and provide a protruding shaft onto which a myriad of mechanisms may be secured, and supported by the ISO connector and the adapter of the present invention.

In a first implementation of the invention, an adapter for use with a shipping container includes a support body and a bolt. The support body includes a front body portion having a front surface and a rear surface arranged opposite to one another along a front-to-back longitudinal direction. The front body portion defines a through bore extending in the longitudinal direction from the front surface to the rear surface. The support body further includes a U-shaped body portion extending in the longitudinal direction from the rear surface of the front body portion. The U-shaped body portion has a central section, a first elongate post and a second elongate post delimiting a cavity therebetween. The central section includes a through bore in longitudinal alignment with the through bore of the front body portion. The first and second elongate posts have a respective rearward-facing end surface. The bolt, in turn, includes a bolt head and a shaft extending from an underside of the bolt head. The shaft is dimensioned to fit through the through bores of the support body. The bolt is movable to adopt several positions. In a first position, the shaft is inserted through the through bores of the support body and protrudes frontward from the front surface of the front body portion, while the underside of the bolt head rests against the rearward-facing end surfaces of the first and second elongate posts. In a second position, the bolt head is at least partially received within the cavity and the bolt head is prevented from rotation about a central longitudinal axis of the shaft of the bolt by the first and second elongate posts; further, the underside of the bolt head and the rear surface of the front body portion of the support body face one another in a spaced-apart configuration providing a clamp.

In a second aspect, the underside of the bolt head and the rear surface of the front body portion can be planar and perpendicular to the longitudinal direction.

In another aspect, the front body portion can be a plate.

In another aspect, the front surface of the front body portion of the support body can be planar and perpendicular to the longitudinal direction.

In another aspect, the rear surface of the front body portion of the support body can be planar and perpendicular to the longitudinal direction.

In another aspect, the rear surface of the front body portion of the support body can encircle at least part of a perimeter of the central section, and preferably encircles the full perimeter of the central section.

In another aspect, the shaft of the can include at least one non-threaded section and/or at least one threaded section. For instance, the shaft can include a threaded section configured to extend from the front surface of the front body portion when the bolt is arranged in the second position. The adapter can further include a threaded nut engageable with a threaded section of the shaft.

In another aspect, an outer perimetral geometry of the bolt head can match an outer perimetral geometry of the U-shaped body portion, and the bolt head can be flush with the U-shaped portion when the bolt is arranged in the first position. For instance, the outer perimetral geometry of the bolt head and the outer perimetral geometry of the U-shaped portion can match a geometry of an ISO connector of an ISO container.

In another aspect, the cavity of the U-shaped body portion can be delimited by an inward facing surface of the first elongate post and an inward facing surface of the second elongate post. The inward facing surfaces can be planar and are arranged facing each other and parallel to each other and to the longitudinal direction.

In another aspect, the cavity of the U-shaped body portion can be delimited by a rearward facing end face of the central section. The rearward facing end face can be planar and arranged perpendicular to the longitudinal direction.

In another aspect, the rearward-facing end surfaces of the first and second elongate posts of the U-shaped body portion can be planar and arranged perpendicular to the longitudinal direction.

In another aspect, the rearward-facing end surfaces of the first and second elongate posts of the U-shaped body portion can be coplanar to one another, and the underside of the bolt head can be planar and arranged perpendicular to the longitudinal direction.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The invention refers to an adapter for use with a shipping container, and more particularly for attachment to a shipping container connector, such as but not limited to a connector, of an ISO shipping container, also referred to as ISO connector. The adapter provides a shaft protruding from and securely connected to the shipping container connector, allowing for a myriad of devices and apparatus to be coupled to the shipping container via the shaft.

Figure 1:
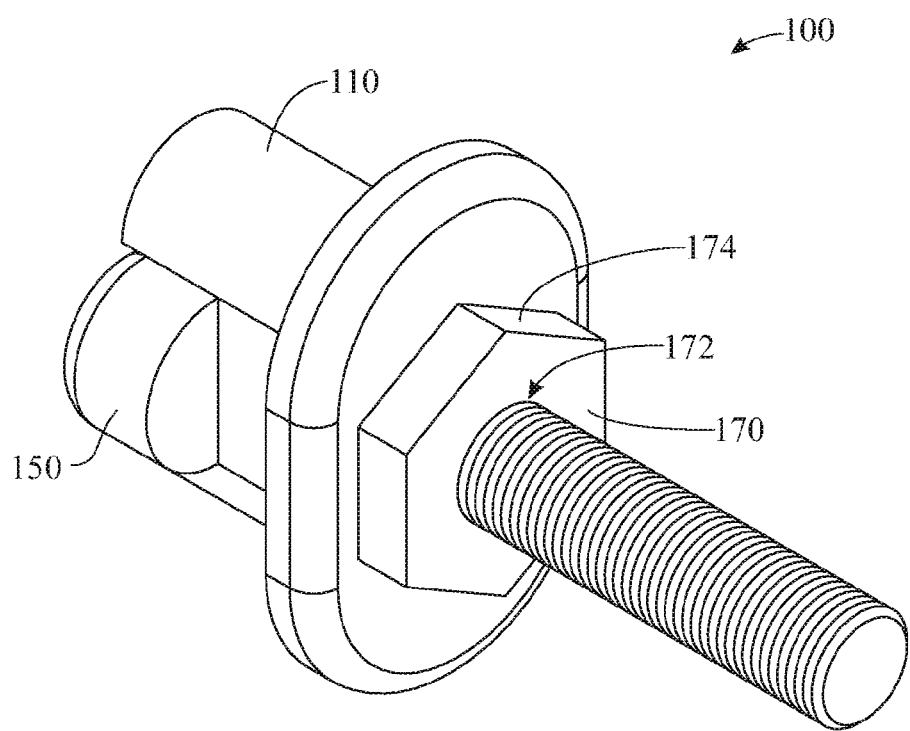
FIG. 1 presents a isometric front view of an exemplary embodiment of an adapter in accordance with the invention, the adapter including a support body, bolt and nut, for use with an ISO container.

As way of example, and referring initially to FIG. 1, an adapter 100 for use with an International Standards Organization (ISO) compliant shipping container in accordance with an illustrative embodiment of the invention is disclosed. The adapter 100 is provided to be attached to an ISO connector or corner connector 250 (FIG. 5) of an ISO container. As shown in FIG. 1, the adapter 100 generally includes a support body 110, a bolt 150 and a nut 170 for securing the bolt 150 to the support body 110. The nut 170 has a threaded bore 172 for receipt of the bolt 150 and a non-rotational, preferably polygonal, and most preferably hexagonal outer surface 174 for non-rotational engagement by a wrench or socket (not shown) to tighten the nut 170 on the bolt 150 in a manner described in more detail hereinbelow.

Figure 2:
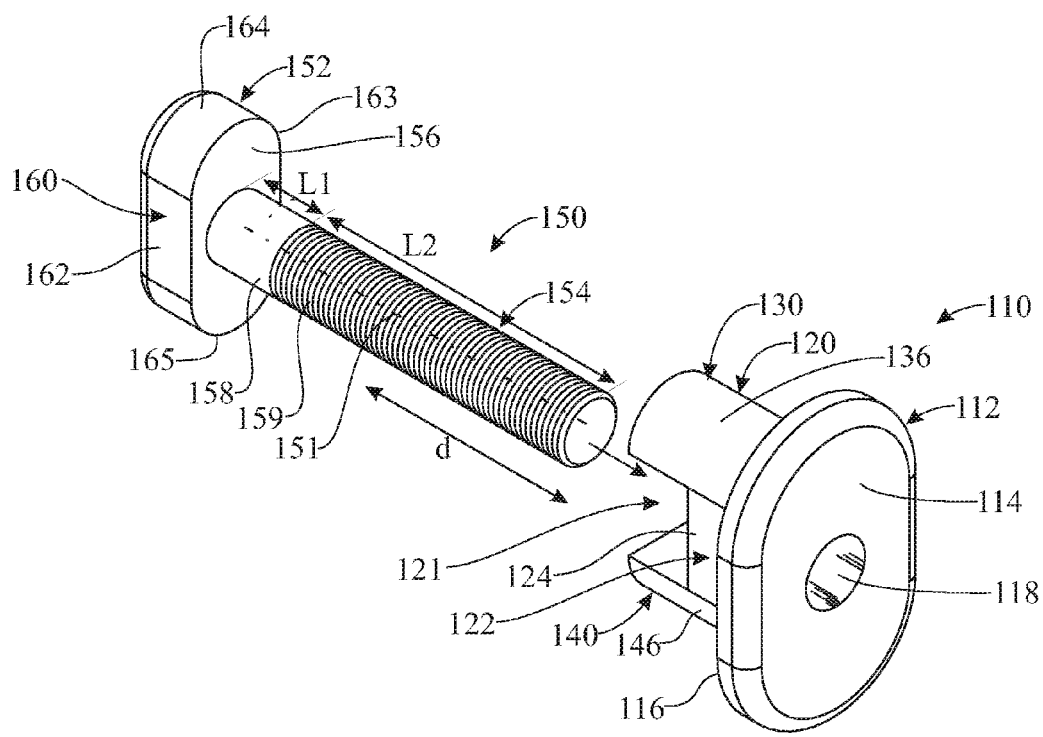
FIG. 2 presents an isometric exploded front view of the support body and bolt of the adapter of FIG. 1.
Figure 3:
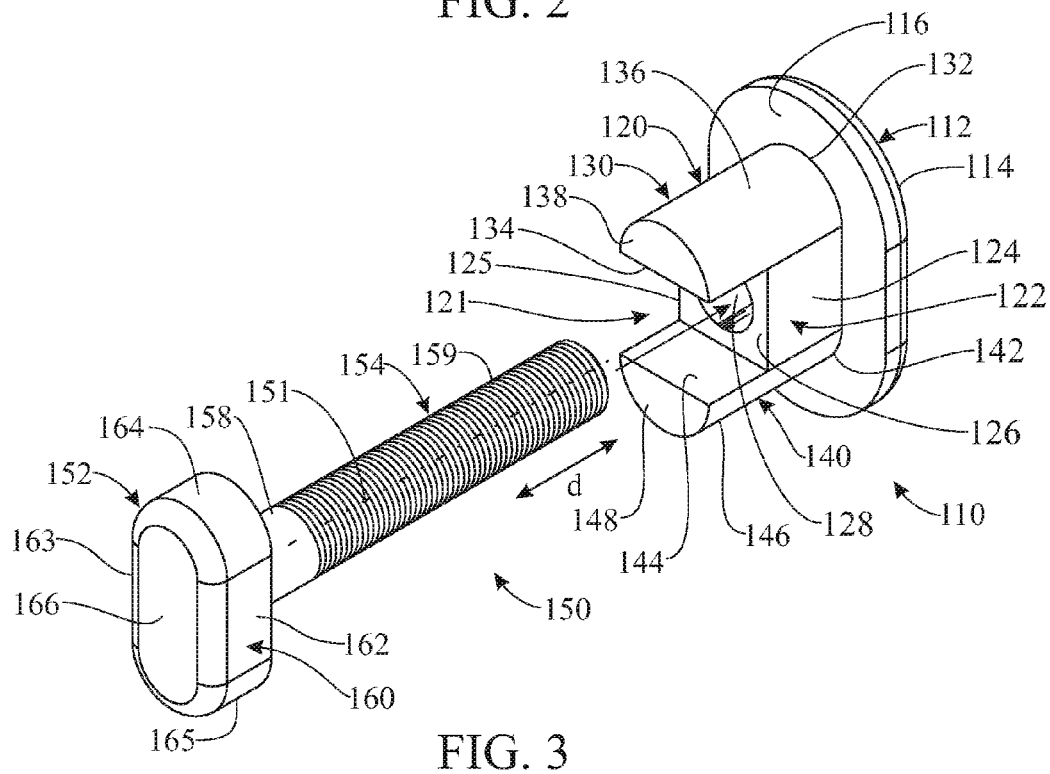
FIG. 3 presents an isometric exploded rear view of the support body and bolt of the adapter of FIG. 1.

The illustrations of FIGS. 2 and 3 depict the support body 110 and bolt 150 in greater detail. As shown, the support body 110 of the present embodiment includes a front body portion 112 and a generally U-shaped body portion 120 that extends longitudinally from the front body portion 112; throughout the present document, 'longitudinal' or 'longitudinally' are to be understood as in a front-to-back, longitudinal direction d. The front body portion 112 is wider than the U-shaped body portion 120, preferably around a full perimeter of the U-shaped body portion 120, providing the support body 110 with an overall T-shape, where the front body portion 112 provides a top, transverse segment of the T-shape and the U-shaped body portion 120 provides a longitudinal segment of the T-shape.

The front body portion 112 comprises a front surface 114, a rear surface 116 and a through bore 118 (FIG. 2) which extends longitudinally from the front surface 114 and through the front body portion 112. As shown, the rear surface 116 is preferably planar and transverse; throughout the present disclosure, 'planar' is to be understood as lying in one plane or flat (and optionally comprising rounded edges as shown in the drawings), and 'transverse' and 'transversely' are to be understood as perpendicular and perpendicularly, respectively, to the longitudinal direction d. The front body portion 112 can be generally oval, as in the present embodiment, or present alternative shapes. The support body 110 further includes a generally U-shaped body portion 120 that extends longitudinally from the rear surface 116 of the front body portion 112, the U-shaped body portion 120 comprising a central section 1, a first elongate post 130 and a second elongate post 140, all of which extend rearward from the rear surface 116 of the front body portion 112. The first and second elongate posts 130 and 140 are positioned on opposite sides of the central section 122, and are longer than the central section 122, longer being understood as having a greater dimension in the longitudinal direction d; thus, the central section 122 and first and second elongate posts 130 and 140 form the aforementioned U-shape and delimit a cavity 121 therebetween.

The central section 122 presents a first outer surface 124 and an opposed second outer surface 125. In some embodiments, such as the embodiment shown herein, the first and second outer surfaces 124 and 125 extend longitudinally and perpendicularly from the transverse rear surface 116 of the front body portion 112. As best shown in FIG. 3, the central section further includes a rearward-facing end face 126 delimited by the first outer surface 124, the second outer surface 125, and the first and second elongate posts 130 and 140. The rearward-facing end face 126 is arranged facing the cavity 121. In some embodiments, the rearward-facing end face 126 is planar and transverse, and thus parallel to the rear surface 116 of the front body portion 112. A through bore 128 extends longitudinally from the rearward-facing end face 126 and through the central section 122. The through bore 128 of the central section 122 and the through bore 118 of the front body portion 112 are arranged in longitudinal registration or alignment, providing a resulting through bore extending from opposite longitudinal ends of the support body 110, i.e. extending from the rearward-facing end face 126 of the central section 122 to the front surface 114 of the front body portion 112.

With continued reference to FIG. 3, the first and second elongate posts 130 and 140 extend from the rear surface 116 of the front body portion 112 at respective first ends 132 and 142 of the first and second elongate posts 130 and 140. In addition, the first and second elongate posts 130 and 140 include respective inward facing surfaces 134 and 144, arranged facing the cavity 121. In some embodiments, such as but not limited to the depicted embodiment, the inward facing surfaces 134 and 144 are longitudinal, parallel to each other, and perpendicular to the first and second outer surfaces 124 and 125 of the central section. The first and second elongate posts 130 and 140 further include respective curved, outward facing surfaces 136 and 146, arranged oppositely to one another. The outward facing surfaces 136 and 146 extend smoothly from and between the first and second outer surfaces 124 and 125 of the central section 122. Finally, the first and second elongate posts 130 and 140 include respective rearward-facing end surfaces 138 and 148, opposed to the first ends 132 and 142. In some embodiments, such as but not limited to the embodiment depicted herein, each one of the rearward-facing end surfaces 138 and 148 is planar and transverse. Furthermore, the rearward-facing end surfaces 138 and 148 can be arranged in a coplanar relationship, as shown.

The first and second outer surfaces 124 and 125 and the outward facing surfaces 136, 146 form a resulting outer perimetral surface of the U-shaped body portion 120 that is configured to fit into a corner connector of a container. For instance, the flat first and second outer surfaces 124 and 125 and the curved outward facing surfaces 136, 146 can be shaped and sized to slidably and easily, yet snugly, fit into an ISO connector as defined, for instance and without limitation, by International Standard ISO 1161:1984 and any further amendments, corrections and/or replacements.

It should be noted that the front body portion 112, the central section 122 and the first and second elongate posts 130 and 140 are preferably formed integrally as a monolithic structure by machining, molding, etc. However, alternative embodiments are contemplated in which any of said parts are provided as separate components which are welded, glued or otherwise connected together by various methods known in the art.

Figure 6:
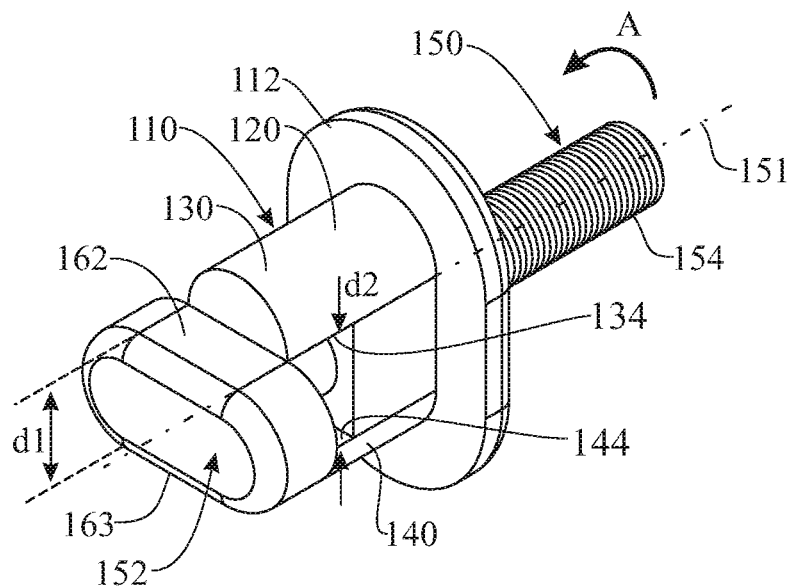
FIG. 6 presents an isometric rear view of the support body and bolt of the adapter of FIG. 1 with the bolt rotated 90 degrees into a second position.

In turn, the bolt 150 includes a bolt head 152 and a shaft 154, the shaft 154 being arranged along a central longitudinal axis 151 and extending from an underside 156 of the bolt head 152. The bolt head 152 is elongated, i.e. a dimension of the bolt head 152 in a first transverse direction is significantly greater than a dimension of the bolt head 152 in a second transverse direction perpendicular to the first transverse direction. In some embodiments, such as but not limited to the present embodiment, the underside 156 is a transverse planar surface, perpendicular to the central longitudinal axis 151. In accordance with the invention, the shaft 154 of the bolt 150 is sized so that it can be received in and freely rotate and slide through the resulting through bore of the support body 110, i.e. through the aligned through bores 128 and 118 of the central section 122 and the front body portion 112. The shaft 154 of the present embodiment includes a rear, non-threaded section 158 which presents a smooth, non-threaded outer surface and is adjacent the underside 156 of the bolt head 152. In addition, the shaft 154 of the present embodiment includes a front, threaded section 159 which extends forward from the non-threaded section 158 and presents a threaded outer surface that is engageable with the not 170. In the present embodiment, the length L2 of the threaded section 159 of the shaft 154 is longer than the length L1 of the non-threaded section 158 of the shaft 154; however, alternative embodiments are contemplated in which the length L2 of the threaded section 159 can be less than or equal to the length L1 of the non-threaded section 158. The bolt head 152 includes an outer side surface 160 having opposed side surfaces 162 and 163 and opposed end surfaces 164 and 165. As shown, the opposed side surfaces 162 and 163 can be planar, parallel to one another, and longitudinally arranged, and the opposed end surfaces 164 and 165 can be curved, providing a generally oval outer side surface 160. The bolt head 152 also has a top surface 166 (FIG. 3), longitudinally opposed to the underside 156, the top surface 166 being generally flat and transverse, with rounded edges that transition into the side and end surfaces 162, 163, 164 and 165. As best shown in FIG. 6, the distance d1 between the side surfaces 162 and 163 of the bolt head 152 is slightly less than the distance d2 between the inward facing surfaces 134 and 144 of the first and second elongate posts 130 and 140 of the support body 110 for purposes that will be hereinafter described.

The opposed flat side surfaces 162 and 163 and opposed curved end surfaces 164 and 165 of the bolt head 152 form a resulting bolt head outer side surface 160 that is configured to fit into a corner connector of a container. For instance, the first and second outer surfaces 124 and 125 and the curved outward facing surfaces 136, 146 can be shaped and sized to slidably fit into an ISO connector as defined, for instance and without limitation, by International Standard ISO 1161:1984 and any further amendments, corrections and/or replacements. In some embodiments, such as in the present embodiment, the resulting surface formed by the opposed flat side surfaces 162, 163 and opposed curved end surfaces 164, 165 of the bolt head 152 and the resulting surface formed by the first and second outer surfaces 124 and 125 and the curved outward facing surfaces 136, 146 of the U-shaped body portion 120 present the same shape and dimensions (but may differ in length, i.e. in their dimension along the longitudinal direction d) so that, when aligned longitudinally, they become flush relative to one another for purposes that will be explained hereinafter.

The adapter 100 may be formed from a variety of materials, such as, for example, metals or metal alloys, polymeric materials, etc. In some embodiments, depending on the intended use, the materials of construction may be chosen from known ASTM materials to satisfy ISO specifications. Alternatively, the materials may be chosen from a group of lesser strength material for public or recreational use where safety is not an issue. Further, the support body 110, the bolt 150 and the nut 170 may be formed from same, similar or dissimilar materials.

Figure 4:
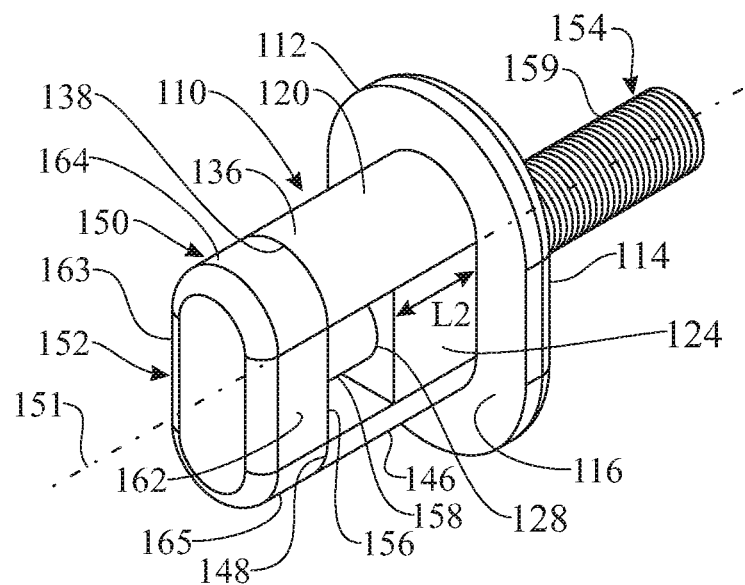
FIG. 4 presents an isometric rear view of the support body and bolt of the adapter of FIG. 1 in an initial, assembled condition with the bolt in a first position.

Referring now to FIGS. 4-9 and initially with regard to FIG. 4, the use of the adapter 100 will now be described.

In order to prepare the adapter 100 for use, the bolt 150 is initially inserted through the central section 122 and the front body portion 112 in a first rotational position about the central longitudinal axis 151, as shown in FIG. 4. Specifically, the threaded section 159 of the shaft 154 of the bolt 150 is inserted through the through bore 128 in the central section 122 and through the through bore 118 (FIG. 2) in the front body portion 112. The bolt 150 is inserted through the support body 110 until the threaded section 159 extends outward and frontward of the front body portion 112, and until the underside 156 of the bolt head 152, in accordance with this first rotational position of the bolt 150, contacts and rests on the rearward-facing end surfaces 138, 148 of the first and second elongate posts 130 and 140 of the support body 110 as shown in FIG. 4. Resting of underside 156 of the bolt head 152 against the rearward-facing end surfaces 138, 148 is enhanced by the fact that the underside 156 and the rearward-facing end surfaces 138, 148 are planar and transversely arranged, allowing them to fully contact one another. Further, having the rearward-facing end surfaces 138, 148 coplanar to one another (i.e. on a same plane) and the underside 156 of the bolt head 152 also planar and formed as a single plane allows the bolt 150 to achieve the depicted position by arranging the bolt in either the illustrated orientation or in an orientation in which the bolt is rotated 180 degrees about the central longitudinal axis 151, facilitating operation of the adapter 100 by the user.

In this position, the bolt head 152 is oriented such that the end surfaces 164, 165 of the bolt head 152 are longitudinally aligned and flush with the outward facing surfaces 136, 146 of the first and second elongate posts 130 and 140 of the support body 110. In turn, the side surfaces 162, 163 of the bolt head 152 are longitudinally aligned and flush with the first and second outer surfaces 124 and 125 of the central section 122 of the support body 110. Thus, the support body 110 and bolt 150 present a smooth unobstructed profile that allows for insertion into a connector of a container. The flat shape of the first and second outer surfaces 124 and 125 and side surfaces 162, 163 and the curved shaped of the outward facing surfaces 136, 146 and end surfaces 164, 165 can be configured fit into an ISO connector, for instance and without limitation. The fact that the resulting surface formed by the opposed flat side surfaces 162 and 163 and opposed curved end surfaces 164 and 165 of the bolt head 152 and the resulting surface formed by the first and second outer surfaces 124 and 125 and the curved outward facing surfaces 136, 146 of the U-shaped body portion 120 are identically shaped and thus flush provides a graphical guidance to the user as to how to use the adapter 100; specifically, the user who is turning the bolt 150 about the central longitudinal axis 151 to achieve the present aligned, insertable position is intuitively informed by the matching of the outer surfaces of the bolt head 152 and U-shaped body portion 120 that the he/she has achieved the aligned, insertable position and that he/she may proceed with the remaining installation steps, as will be explained hereinafter.

Figure 5:
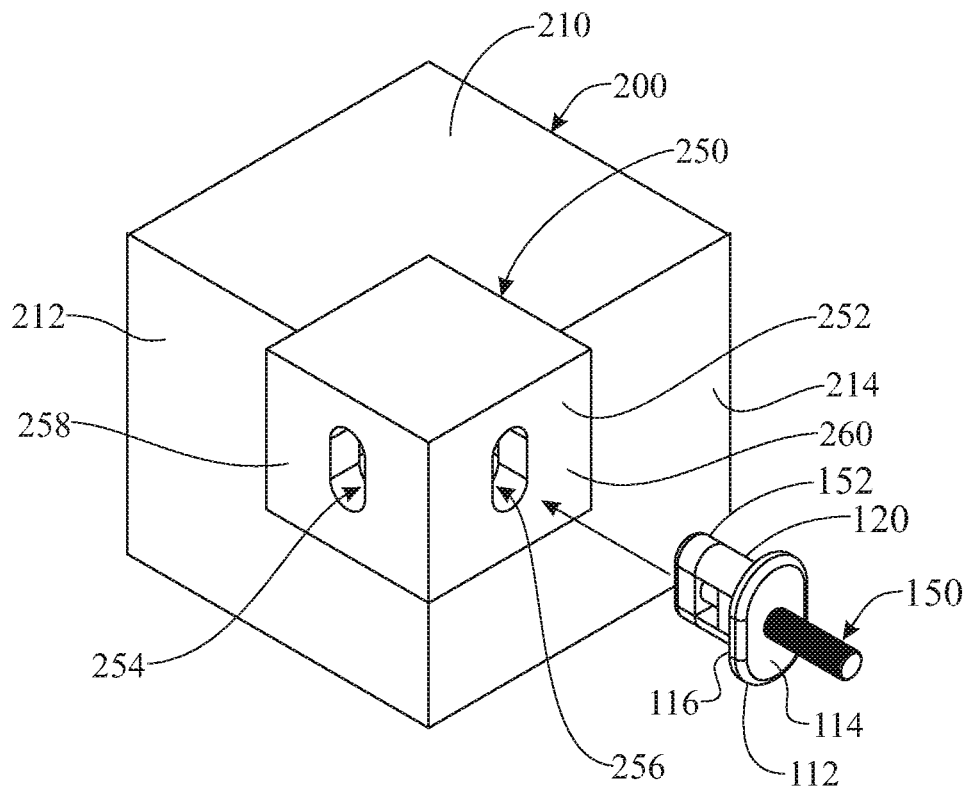
FIG. 5 presents an isometric front view of the support body and bolt of the adapter of FIG. 1 in the first position of FIG. 4, being initially inserted in a connector of an ISO container.

With reference now to FIG. 5, there is illustrated a partial view of an ISO container 200 having an ISO connector or corner connector 250. The corner connector 250 is located at the intersection of three sides of the ISO container 200, for example at the intersection of a top side 210 and first and second vertical sides 212 and 214. The corner connector 250 consists of a hollow, rectangular block 252 having oval openings 254, 256 defined in sides 258, 260 of the hollow block 252.

In a further step of the installation process, the bolt 150 and the support body 110 in the aligned position of FIG. 4, more particularly the aligned bolt head 152 and U-shaped body portion 120, are inserted through the one of the oval openings, such as the oval opening 256, until the rear surface 116 of the front body portion 112 of the support body 110 contacts the side 260 of the corner connector 250. Contact of the rear surface 116 against the side 260 can be enhanced by having the rear surface 116 constructed transverse and planar, as shown. In this initially inserted position, the front body portion 112 and a portion of the shaft 154 protrude outward from the side 260 of the corner connector 250 while the U-shaped body portion 120 and bolt head 152 remain hidden inside the corner connector 250.

Figure 7:
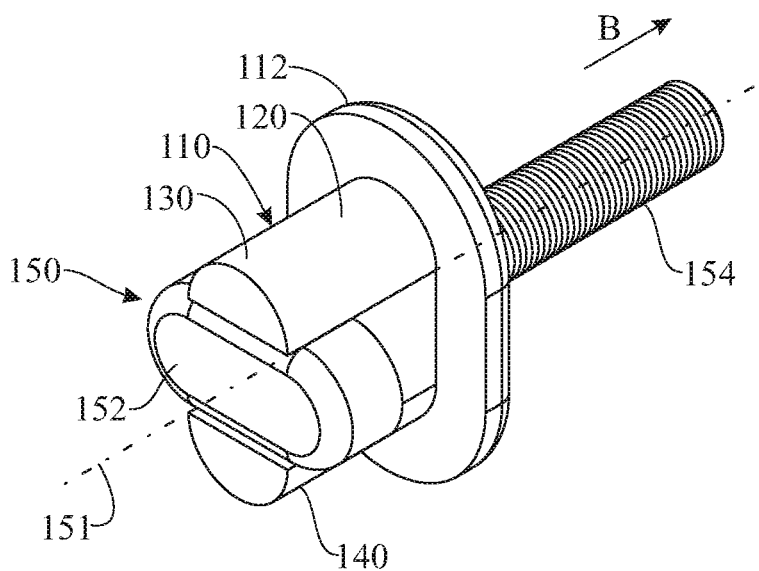
FIG. 7 presents an isometric rear view of the support body and bolt of the adapter of FIG. 1 with the bolt advanced through the support body into a third position rotationally locking the bolt within the support body.

Referring to FIGS. 6 and 7, after insertion through the oval opening 256 on the side 260 of the corner connector 250 (FIG. 5), the user exerts a turning force on the portion of the shaft 154 that protrudes outward, as indicated for instance by arrow A. Since the support body 110 is snugly fit into a non-cylindrical cavity (the opening 256) and thus cannot rotate, the turning force causes the bolt 150 to turn with respect to the support body 110 about the central longitudinal axis 151. Having the underside 156 and rearward-facing end surfaces 138, 148 planar and transverse facilitates rotating the bolt 150 about the central longitudinal axis 151 without the bolt moving longitudinally and reduces the effort required by the user to rotate the bolt 150. Once the user carries out a 90-degree rotation of the bolt shaft 154, the bolt head 152 reaches a second position relative to the first and second elongate posts 130 and 140 of the support body 110, as shown in FIG. 6. In this second position, the bolt 150 is longitudinally released due to the fact that the distance d1 between the side surfaces 162, 163 of the bolt head 152 is slightly less than the distance d2 between the inward facing surfaces 134, 144 of the first and second elongate posts 130 and 140 of the support body 110.

In a further step, as shown in FIG. 7, the user exerts a pulling force on the protruding portion of the shaft 154 as indicated by arrow B, i.e. pulls the bolt 150 outward from the corner connector 250. A sufficient pulling force causes the bolt 150 to move in the longitudinal direction d. In consequence, the shaft 154 of the bolt 150 moves outward to protrude further from the front body portion 112 and the bolt head 152 slides forward between the first and second elongate posts 130 and 140 (FIG. 7) to a third position. In this third position, because the distance d1 between the side surfaces 162, 163 of the bolt head 152 is only slightly less than the distance d2 between the inward facing surfaces 134, 144 of the first and second elongate posts 130 and 140 of the support body 110, the bolt 150 is firmly locked between the first and second elongate posts 130 and 140 and against any rotation relative to the support body 110. Thus, any rotational forces applied to the shaft 154 of the bolt 150 in this third position are transferred to the support body 110 and further to the corner connector 250, which is designed to withstand enormous forces. This transfer effect is enhanced by having the inward-facing surfaces 134, 144 and the side surfaces 162, 163 planar, and by said surfaces being disposed parallel to each other in this third position.

Figure 8:
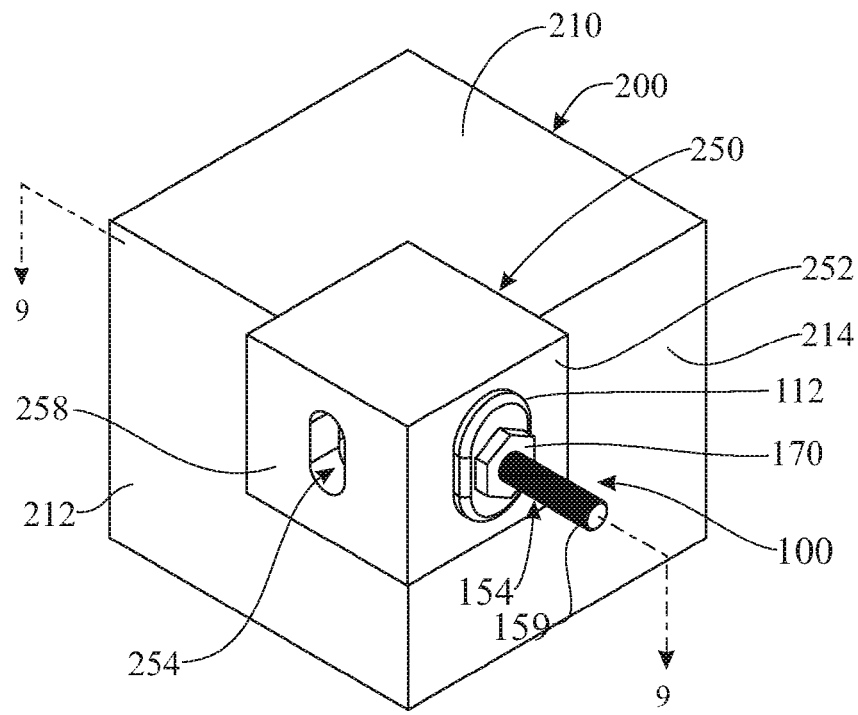
FIG. 8 presents an isometric front view of the adapter of FIG. 1 assembled in the connector of the ISO container, and secured to the ISO connector of the ISO container by the bolt being arranged in the third position of FIG. 7.
Figure 9:
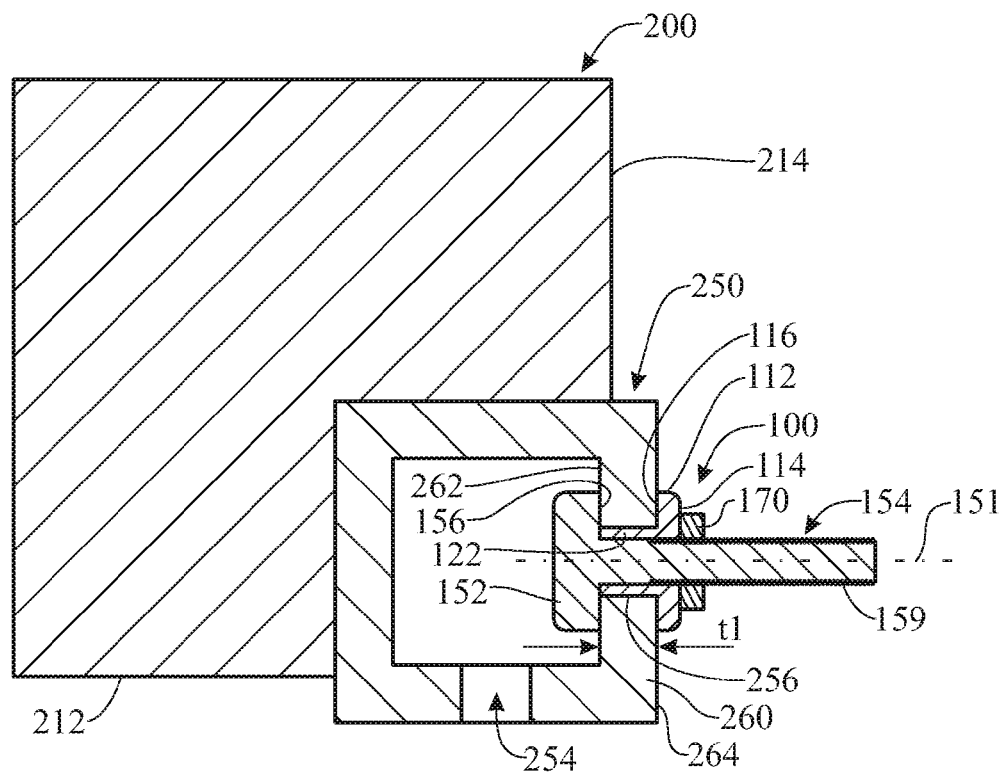
FIG. 9 presents a cross-sectional top plan view, taken along line 9-9 of FIG. 8, of the adapter, connector and a portion of the ISO container including the ISO connector.

Referring to FIGS. 8 and 9, as shown, after the bolt head 152 has been rotated and the bolt 150 pulled outward through the corner connector 250 as explained with reference to FIG. 7, the rear surface 116 of the front body portion 112 rests on the side 260 of the corner connector 250 and the shaft 154 of the bolt 150 extends outward of the front body portion 112. Thereafter, the nut 170 is threaded down over the threaded section 159 of the shaft 154 of the bolt 150 to secure the adapter 100 to the corner connector 250. As can best be seen in FIG. 9, the corner connector 250 has side 260, with a thickness t1, defining the length of the oval opening 256. The central section 122 has a thickness t2 (FIG. 4) substantially equal to the thickness t1 of the side 260. In consequence, upon tightening the nut 170 down on the threaded front surface 136 of the shaft 154, the side 260 is captured or clamped between the bolt head 152 and the front body portion 112. Specifically, the underside 156 of the bolt head 152 is clamped against an inner surface 262 of the side 260 of the corner connector 250, while the rear surface 116 of the front body portion 112 is clamped against an outer surface 264 of the side 260. Clamping is enhanced by having the underside 156 of the bolt head 152 and the rear surface 116 of the front body portion 112 planar and transversely arranged, to fully rest on the flat, parallel inner and outer surfaces 262 and 264, respectively. In turn, having a planar transverse front surface 114 of the front body portion 112 allows the nut 170 to flatly and firmly rest against the front body portion 112 and thus enhances tightening of the adapter 100 against the corner connector 250. Flat pressing of surfaces onto other surfaces will also contribute to distribute load forces evenly within the adapter 100 and the corner connector 250, increasing the resistance of the connection therebetween.

In this manner, the adapter 100 is firmly affixed to the corner connector 250 of the ISO container 200. The shaft 154 of the bolt 150 is now readily available for attaching other components to the ISO container 20a Any forces exerted on the shaft 154 will be transmitted to the side 260 of the corner connector 250, most especially by the tight clamping of the adapter 100 to the corner connector 250, and by the flat resting of the adapter's surfaces on one another and on corner connector surfaces as explained heretofore.

Figure 10:
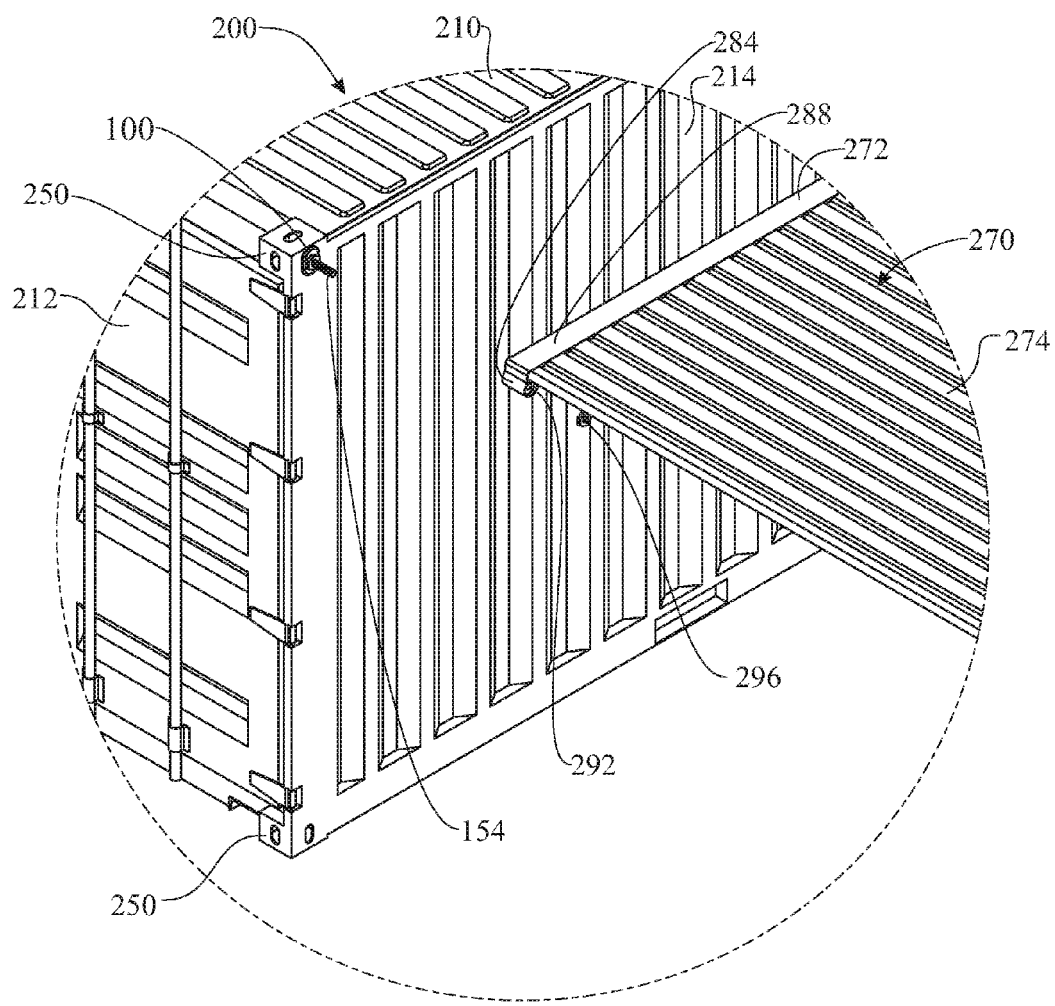
FIG. 10 presents an isometric view of one application of the adapter of FIG. 1 for use in connecting a canopy to an ISO container.
Figure 11:
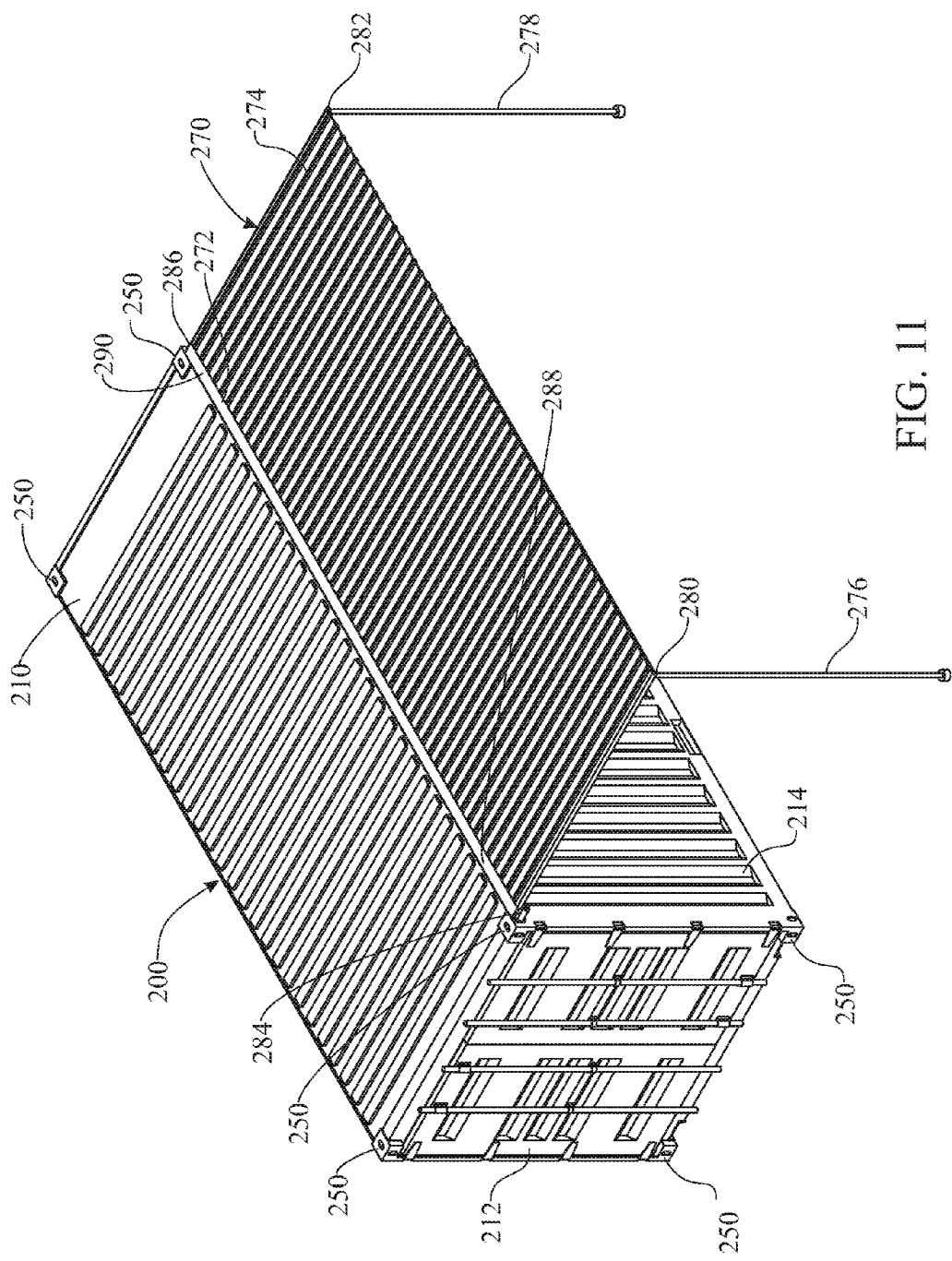
FIG. 11 presents an isometric view of the canopy connected to the ISO container of FIG. 10.

Referring now to FIGS. 10 and 11, the use of the adapter 100 to attach a canopy assembly 270 to the ISO container will now be described. Initially, the adapter 100 is securely affixed to the corner connector 250 on the ISO container as described hereinabove. The canopy assembly 270 is provided to shelter people or equipment at a site, for example a construction site or a disaster-relief temporary housing site, and generally includes a front frame bar 272, a canopy 274 and a pair of support legs 276 and 278 extending downward from opposing rear corners 280 and 282 of the canopy (FIG. 11). Two hollow, tubular connectors 284 and 286 are provided at opposing first and second ends 288 and 290 of the front frame bar 272 and define respective through bores, a through bore 292 corresponding to tubular connector 284 being shown in FIG. 10.

With specific reference to the tubular connector 284 at front frame bar 272 of the canopy assembly 270, to attach the canopy assembly 270 to the ISO container 200, the tubular connector 284 is initially advanced over the shaft 154 of the bolt 150 of the adapter 100. The protruding threaded section 159 of the shaft 154 passes through the through bore 292 of the tubular connector 284 and a nut 296 is threaded down over the threaded section 159 of the shaft 154 to secure the tubular connector 284 to the adapter 100. While not specifically shown, the same operation is performed with a second adapter 100 in a second corner connector 250 to attach the opposing second end 290 of the front frame bar 272 to the ISO container 200. In this manner, the canopy assembly may be quickly and easily attached to the ISO container. Forces exerted on the canopy assembly by wind, rain or the like are transferred by the adapters 100 to the corner connectors 250 supporting the canopy assembly.

Figure 12:
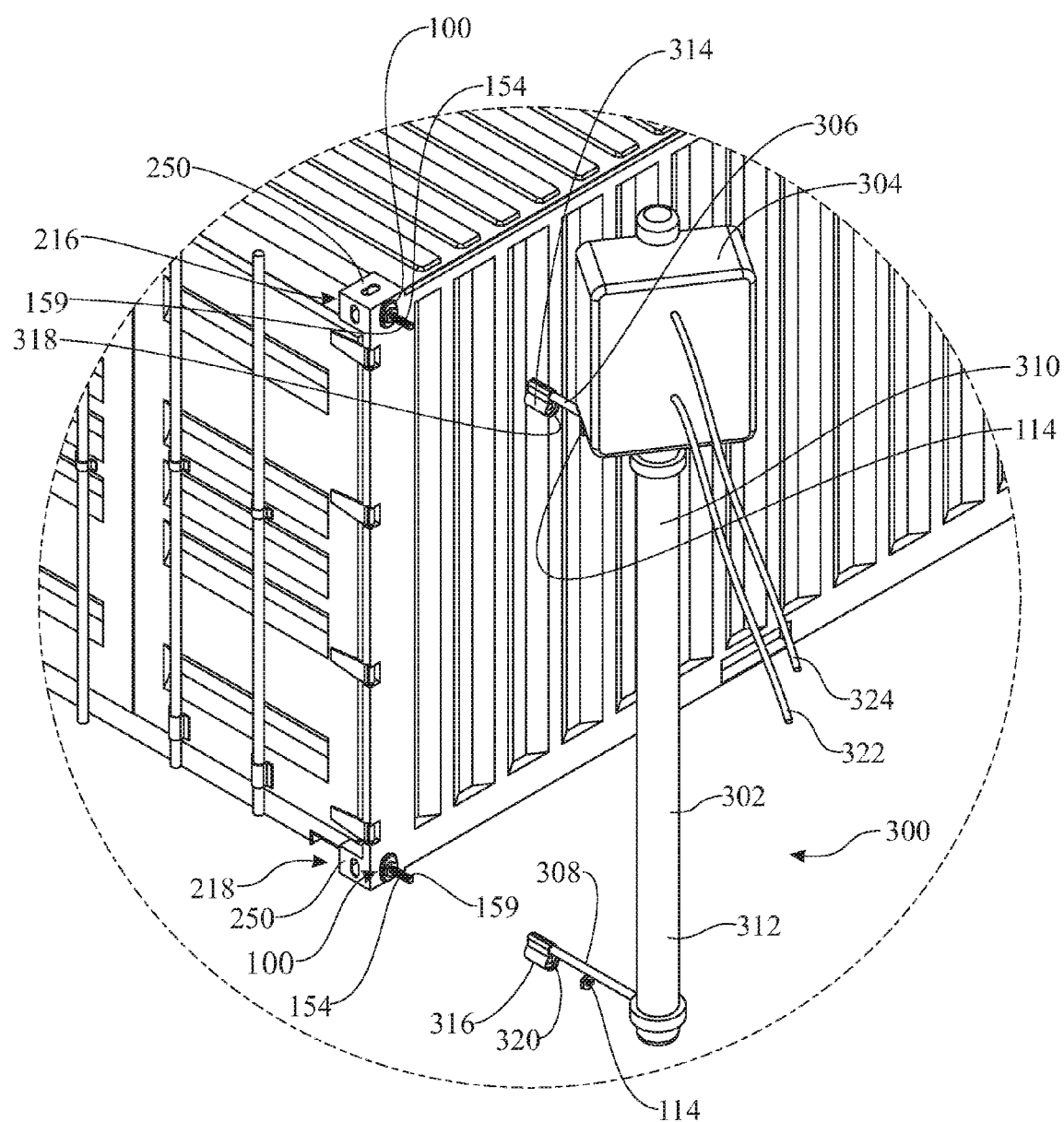
FIG. 12 presents an isometric view of an alternative application of the adapter of FIG. 1, in which two adapters are used for connecting an electrical power post to a top and a bottom connector of an ISO container.
Figure 13:
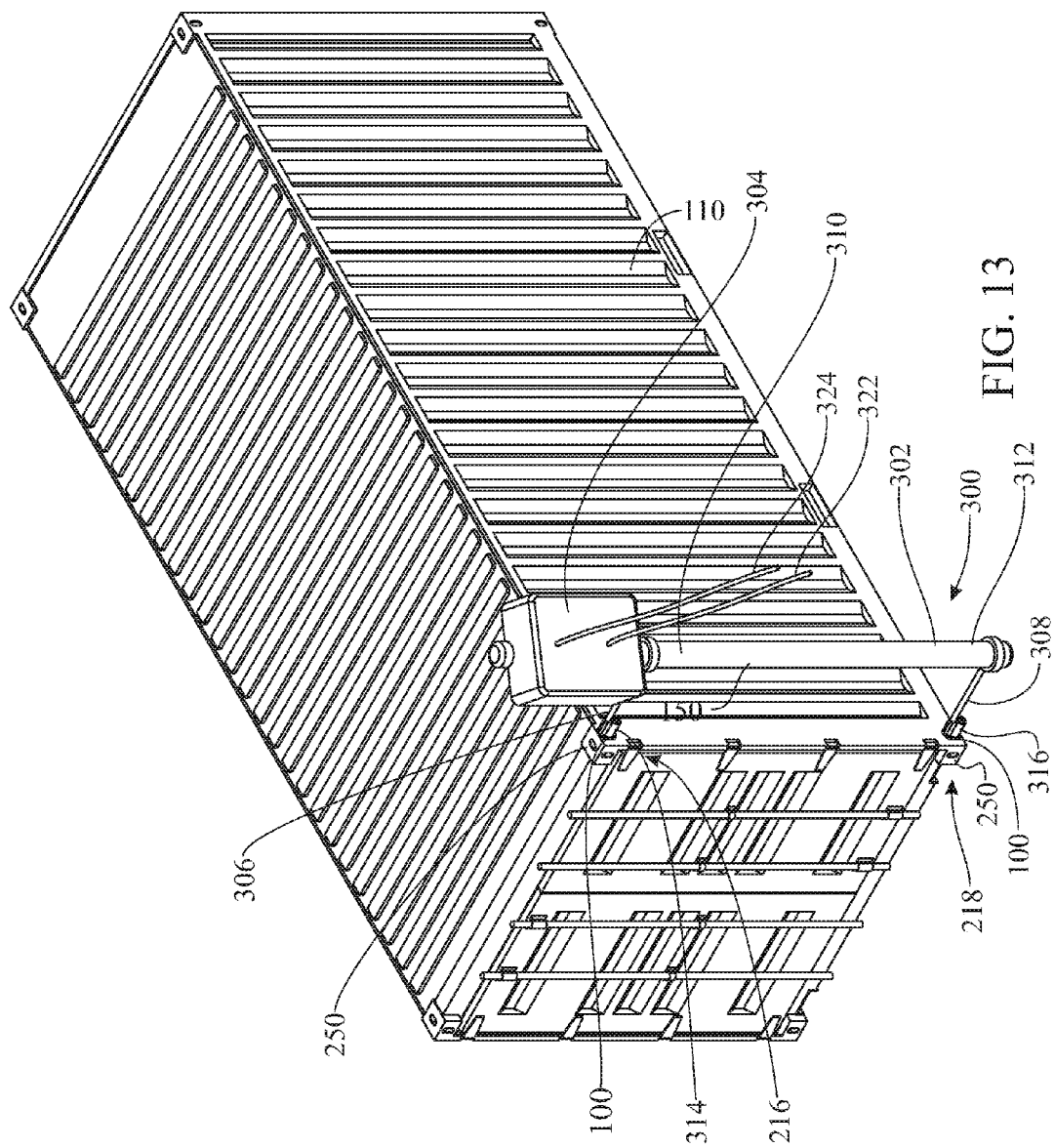
FIG. 13 presents an isometric view of the electrical power post of FIG. 12 connected to the ISO container.

Referring to FIGS. 12 and 13, there is shown another application of the disclosed adapter 100 for use in attaching an electrical power post 300 to the ISO container 200. In this application, a pair of adapters 100 are inserted and connected to a pair of corner connectors 250 positioned at top and bottom corners 216 and 218, respectively, of the ISO container 200.

The electrical power post 300 includes a main post 302 and an electrical panel box 304. Two extension shafts 306 and 308 extend from a top and bottom 310 and 312 of the main post 302. A tubular connector 314 is provided on the extension shaft 306 and a tubular connector 316 is provided on the extension shaft 308. Tubular connectors 314 and 316 include respective through bores 318 and 320 and are provided to attach the electrical power post 300 to the ISO container 200. Two power leads 322 and 324 extend from the electrical panel box for use in receiving and transmitting auxiliary power to components such as, for example, generators, lights, compressors, etc.

Similar to that described hereinabove, the tubular connectors 314 and 316 of the electrical power post 300 are positioned over the shafts 154 of the adapters 100 such that the threaded sections 159 of the shafts 154 pass through the through bores 318 and 320. Thereafter, two respective nuts 396 are threaded onto the shafts 154 to thereby secure the electrical power post 300 to the top and bottom corners 216 and 218 of the ISO container 200.

Figure 14:
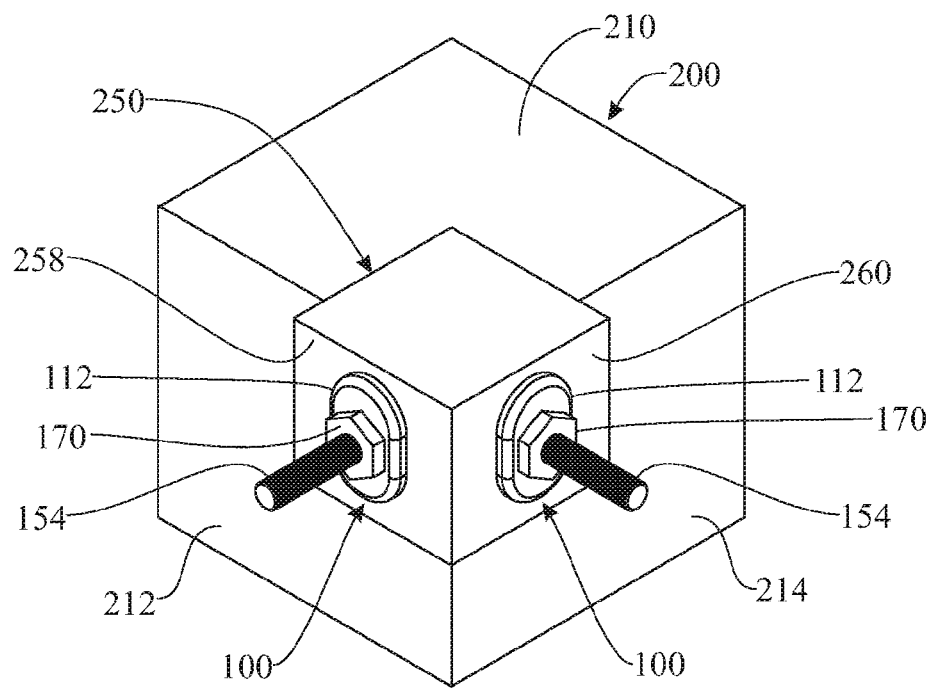
FIG. 14 presents an isometric view of a further application of the adapter of FIG. 1, illustrating two adapters attached to two respective openings on adjacent sides of an ISO connector of an ISO container.

In a further exemplary application of the invention, as shown in FIG. 14, the corner connector 250 can accept a pair of adapters 100. The attachment of a first adapter 100 to the side 260 of the corner connector 250 through oval opening 256 was described in detail hereinabove. Likewise, a second adapter 100, including a respective support body 110 and bolt 150, may be passed through the oval opening 254 in side 258 (also shown in FIG. 8) and the bolt 150 rotated 90 degrees and advanced through the support body 110. Thereafter, the nut 170 may be used to firmly affix the support body 110 and bolt 150 to the corner connector 250 or may be used to firmly connect and auxiliary structure to multiple sides of the ISO container 200 via the corner connector 250.

Figure 15:
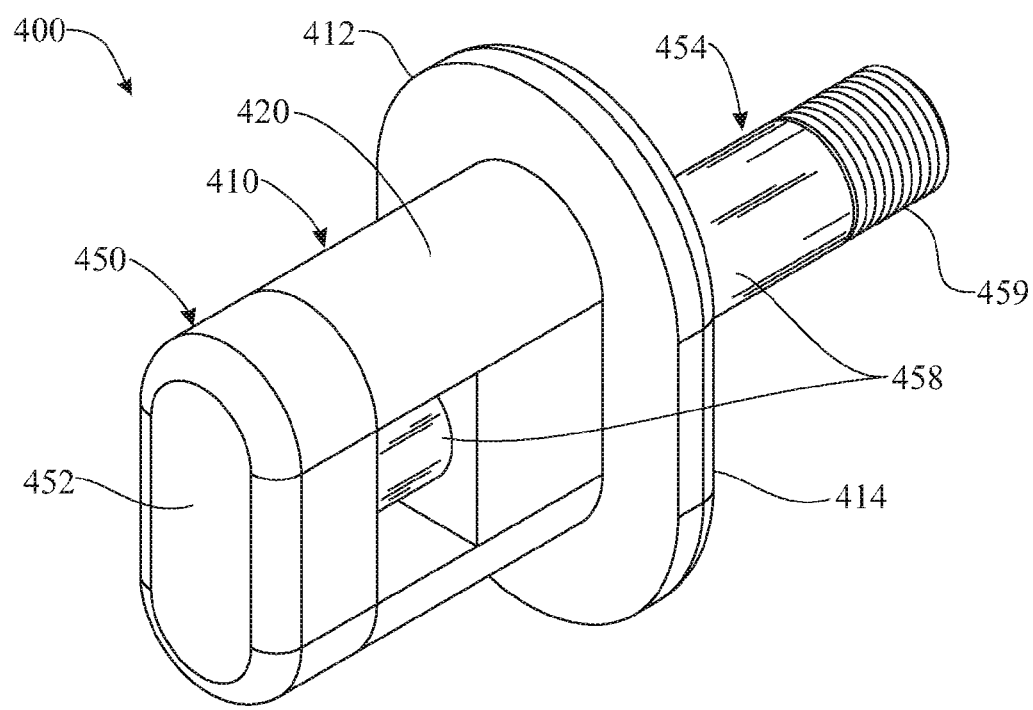
FIG. 15 presents an isometric rear view of a second embodiment of an adapter, having a partially threaded bolt shaft with a longer non-threaded section and a shorter threaded section than that of the embodiment of FIG. 1, for use with an ISO container.

With reference now to FIG. 15, there is disclosed an alternative embodiment of an adapter 400 for a shipping container, where like features of the adapter 400 and the adapter 100 (FIGS. 1 through 9) are numbered the same except preceded by the numeral '4'. The adapter 400 comprises a support body 410, a bolt 450 and a nut. The support body 410 is substantially identical to the support body 110 described hereinabove. While not specifically shown, the nut of the present embodiment can be, for instance and without limitation, identical to the nut 170 described hereinabove. In turn, the bolt 450 generally includes a bolt head 452 having a shaft 454 extending from an underside of the bolt head 452. The bolt head 452 can be identical to the bolt head 152 described hereinabove. The shaft 454 of the bolt 450 includes a rear elongated smooth or non-threaded section 458 and a shortened, front threaded section 459. In this embodiment, the length of the rear non-threaded section 458 is significantly greater than the length of the shortened, front threaded section 459. The smooth rear non-threaded section 458 allows a connected structure mounted on the non-threaded section 458 to freely rotate about the shaft 454 if that is desired, while the front threaded section 459 still allows sufficient threaded area for the nut to engage and secure the adapter 400 and any auxiliary structure to an ISO container 200. This can be desirable for many applications. For instance, the portion of non-threaded section 458 protruding outward from the front surface 414 of the front body portion 412 can receive a bearing assembly that, in turn, rotatably supports a wheel, while the front threaded section 459 extending farther outward can receive a nut or the like for longitudinally securing the bearing assembly and the wheel. Thus, the present invention provides an easily installable and extremely robust adapter which can allow transforming a conventional ISO container into a wheeled container. In some embodiments, the shaft 454 can include a threaded section (not shown) configured to remain adjacent to the front surface of the front body portion 412 (the front surface being similar to the front surface 114 of the first embodiment), in order to allow the threading of a nut onto the front surface of the front plant 412, similarly to the nut 170 depicted in FIG. 8.

Alternative embodiments to those depicted herein are contemplated, without departing from the scope of the present invention. For instance, the bolt shaft can include any particular number and relative arrangement of non-threaded and threaded sections, or alternatively, can be entirely non-threaded or entirely threaded. In another example, the front body portion may have variable thicknesses and shapes, such as a shape of a block or any other front body portion adapted to rest on the outer surface of the connector and participate in clamping the connector as described heretofore. In addition, the front body portion may not extend transversely from the U-shaped body portion around the full perimeter thereof. In some embodiments, the U-shaped body portion may not be centered with respect to the U-shaped body portion (unlike the embodiments depicted herein).

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. An adapter for use with a shipping container, comprising:
  a support body comprising:
    a front body portion having a front surface and a rear surface arranged opposite to one another along a front-to-back longitudinal direction, the front body portion defining a through bore extending in the longitudinal direction from the front surface to the rear surface, and
    a U-shaped body portion extending in the longitudinal direction from the rear surface of the front body portion, the U-shaped body portion comprising a central section, a first elongate post and a second elongate post each perpendicularly extending from a rear surface of the central section and delimiting a cavity therebetween, wherein the central section comprises a through bore in longitudinal alignment with the through bore of the front body portion, and wherein the first and second elongate posts comprise a respective rearward-facing end surface; and
  a bolt having a bolt head and a shaft extending from an underside of the bolt head, the shaft dimensioned to fit through the through bores of the support body;
  wherein the bolt is movable from:
    a first position in which the shaft is inserted through the through bores of the support body and protrudes frontward from the front surface of the front body portion, and in which the underside of the bolt head rests against the rearward-facing end surfaces of the first and second elongate posts and an outer perimetal geometry of the bolt head matches an outer perimetal geometry of the U-shaped body portion such that the U-shaped body portion and bolt head can be inserted through an opening in a sidewall of a corner connector of the shipping container and such that the rear surface of the front body portion abuts the sidewall, to
    a second position in which the bolt head is at least partially received within the cavity and the bolt head is prevented from rotation about a central longitudinal axis of the shaft of the bolt by the first and second elongate posts, and further in which the underside of the bolt head and the rear surface of the front body portion of the support body face one another in a spaced-apart configuration such that the bolt head abuts the sidewall of the corner connector and clamps the sidewall therebetween, and further in which a threaded section of the bolt shaft is arranged frontward of the front surface of the front body portion and receives a threaded nut which presses against the front surface of the front body portion to clamp the sidewall.

2. The adapter of claim 1, wherein the underside of the bolt head and the rear surface of the front body portion are planar and perpendicular to the longitudinal direction.

3. The adapter of claim 1, wherein the front body portion is a plate.

4. The adapter of claim 1, wherein the front surface of the front body portion of the support body is planar and perpendicular to the longitudinal direction.

5. The adapter of claim 1, wherein the rear surface of the front body portion of the support body is planar and perpendicular to the longitudinal direction.

6. The adapter of claim 1, wherein the rear surface of the front body portion of the support body encircles at least part of a perimeter of the central section.

7. The adapter of claim 1, wherein the rear surface of the front body portion of the support body encircles a full perimeter of the central section.

8. The adapter of claim 1, wherein the shaft of the bolt comprises a non-threaded section.

9. The adapter of claim 1, wherein the outer perimetral geometry of the bolt head and the outer perimetral geometry of the U-shaped portion match a geometry of an ISO connector of an ISO container.

10. The adapter of claim 1, wherein the cavity of the U-shaped body portion is delimited by an inward facing surface of the first elongate post and an inward facing surface of the second elongate post, wherein the inward facing surfaces are planar and are arranged facing each other and parallel to each other and to the longitudinal direction.

11. The adapter of claim 1, wherein the cavity of the U-shaped body portion is delimited by a rearward facing end face of the central section, wherein the rearward facing end face is planar and arranged perpendicular to the longitudinal direction.

12. The adapter of claim 1, wherein the rearward-facing end surfaces of the first and second elongate posts of the U-shaped body portion are planar and are arranged perpendicular to the longitudinal direction.

13. The adapter of claim 12, further wherein the rearward-facing end surfaces of the first and second elongate posts of the U-shaped body portion are coplanar to one another, and the underside of the bolt head is planar and arranged perpendicular to the longitudinal direction.

14. The adapter of claim 1, wherein the threaded section of the shaft of the bolt is also arranged frontward of the front surface of the front body portion when the bolt is arranged in the first position.

15. An adapter for use with a shipping container, comprising:
a support body comprising:
a front plate having a front surface and a rear surface arranged opposite to one another along a front-to-back longitudinal direction, the front plate defining a through bore extending in the longitudinal direction from the front surface to the rear surface, and
a U-shaped body portion extending in the longitudinal direction from the rear surface of the front plate, the U-shaped body portion comprising a central section, a first elongate post and a second elongate post each perpendicularly extending from a rear surface of the central section and delimiting a cavity therebetween, wherein the central section comprises a through bore in longitudinal alignment with the through bore of the front plate, and wherein the first and second elongate posts comprise a respective rearward-facing end surface; and
a bolt having a bolt head and a shaft extending from an underside of the bolt head, the shaft dimensioned to fit through the through bores of the support body;
wherein the bolt is movable from:
a first position in which the shaft is inserted through the through bores of the support body and protrudes frontward from the front surface of the front plate, and in which the underside of the bolt head rests against the rearward-facing end surfaces of the first and second elongate posts and an outer perimetral geometry of the bolt head matches an outer perimetral geometry of the U-shaped body portion such that the U-shaped body portion and bolt head can be inserted through an opening in a sidewall of a corner connector of the shipping container and such that the rear surface of the front plate abuts the sidewall, to
a second position in which the bolt head is at least partially received within the cavity and the bolt head is prevented from rotation about a central longitudinal axis of the shaft of the bolt by the first and second elongate posts, and further in which the underside of the bolt head and the rear surface of the front plate of the support body face one another in a spaced-apart configuration such that the bolt head abuts the sidewall of the corner connector and clamps the sidewall therebetween, and further in which a threaded section of the bolt shaft is arranged frontward of the front surface of the front plate and receives a threaded nut which presses against the front surface of the front plate to clamp the sidewall.

16. The adapter of claim 15, wherein the underside of the bolt head and the rear surface of the front plate are planar and perpendicular to the longitudinal direction.

17. An adapter for use with a shipping container, comprising:
a support body comprising:
a front body portion having a front surface and a rear surface arranged opposite to one another along a front-to-back longitudinal direction, the front body portion defining a through bore extending in the longitudinal direction from the front surface to the rear surface, and
a U-shaped body portion extending in the longitudinal direction from the rear surface of the front body portion, the U-shaped body portion comprising a central section, a first elongate post and a second elongate post each perpendicularly extending from a rear surface of the central section and delimiting a cavity therebetween, wherein the central section comprises a through bore in longitudinal alignment with the through bore of the front body portion, and wherein the first and second elongate posts comprise a respective rearward-facing end surface; and
a bolt having a bolt head and a shaft extending from an underside of the bolt head, the shaft dimensioned to fit through the through bores of the support body;
wherein the underside of the bolt head and the rear surface of the front body portion are planar and perpendicular to the longitudinal direction; and
further wherein the bolt is movable from:
a first position in which the shaft is inserted through the through bores of the support body and protrudes frontward from the front surface of the front body portion, and in which the underside of the bolt head rests against the rearward-facing end surfaces of the first and second elongate posts and an outer perimetral geometry of the bolt head matches an outer perimetral geometry of the U-shaped body portion such that the U-shaped body portion and bolt head can be inserted through an opening in a sidewall of a corner connector of the shipping container and such that the rear surface of the front body portion abuts the sidewall, to a second position in which the bolt head is at least partially received within the cavity and the bolt head is prevented from rotation about a central longitudinal axis of the shaft of the bolt by the first and second elongate posts, and further in which the underside of the bolt head and the rear surface of the front body portion of the support body face one another in a spaced-apart configuration such that the bolt head abuts the sidewall of the corner connector and clamps the sidewall therebetween, and further in which a threaded section of the bolt shaft is arranged frontward of the front surface of the front body portion and receives a threaded nut which presses against the front surface of the front body portion to clamp the sidewall.

* * * * *